March 7, 1967 J. J. EXON 3,307,398
CONDITION RESPONSIVE BRIDGE BALANCING CIRCUIT
Filed Dec. 19, 1963 2 Sheets-Sheet 1

INVENTOR.
JOHN J. EXON
BY Bruce C. Lutz
ATTORNEY

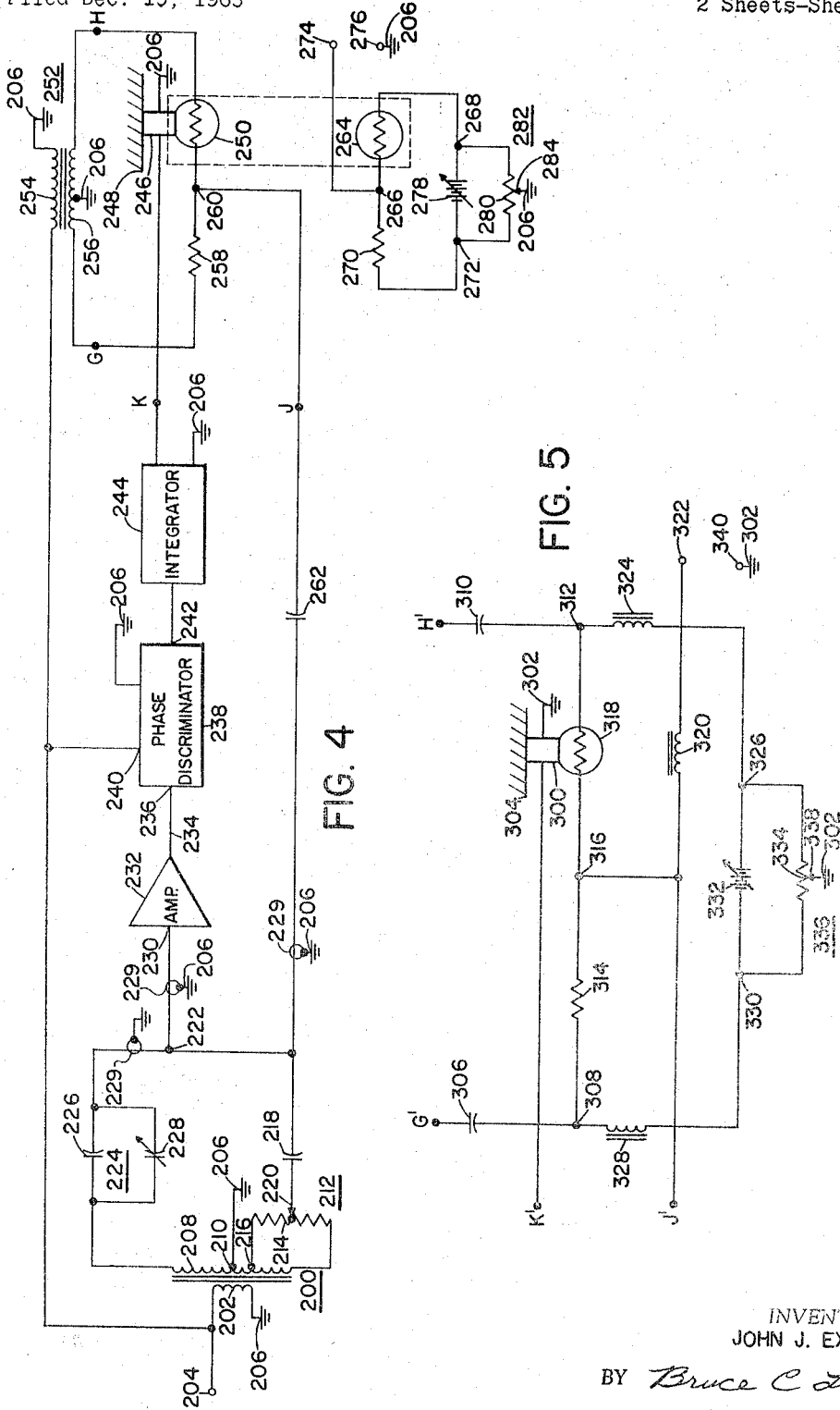

United States Patent Office 3,307,398
Patented Mar. 7, 1967

3,307,398
CONDITION RESPONSIVE BRIDGE
BALANCING CIRCUIT
John J. Exon, Fridley, Minn., assignor to Honeywell Inc.,
a corporation of Delaware
Filed Dec. 19, 1963, Ser. No. 331,791
9 Claims. (Cl. 73—304)

This invention pertains generally to closed loop systems and more particularly to a closed loop system wherein mechanical moving parts are eliminated.

An illustrated embodiment of the invention pertains to a rebalanceable fuel gauge circuit but the invention is not limited to fuel gauges as it can be used in other areas wherein an output is desired which is indicative of an input signal. The circuitry described can be used as a demodulator or it can be designed such that an output signal is obtained which has a polarity and a magnitude indicative of the phase and the amplitude of an alternating input signal. It may be desirable to use such a demodulator in an application where complete electrical isolation is required between the input and the output signals.

In one embodiment of the invention an input signal from a condition sensitive bridge is amplified and applied to a logic circuit such that heat sensitive resistors in a second bridge circuit are selectively lowered in resistance by the application of heat to provide an output signal from the bridge. The output signal from the second bridge has both an alternating and a direct voltage component. The alternating component is fed back to the input of the amplifier to cancel out the effect of the condition signal. At balance, the direct voltage component is indicative of the condition. This embodiment uses two thermistors wherein one thermistor or the other is heated by the outputs of the logic means to change the ratio of resistance in the legs of the bridge.

Another embodiment uses only one thermistor which is either heated or not heated to provide the necessary change in bridge circuit resistance. Of course, this circuit is only used where the long response times will not interfere with satisfactory operation of the circuit.

A third embodiment utilizes a Peltier device to heat or cool a temperature sensitive device such as a thermistor in response to an output signal from the logic means. This last mentioned embodiment may have complete electrical isolation between the alternating and direct voltage signals if satisfactory matching can be obtained between characteristics of two separate thermistor units attached to one junction of a Peltier device.

It is an object of this invention to provide an improved automatic rebalancing circuit.

Another object of this invention is to eliminate continuously moving mechanical parts in a fuel gauge unit.

Further objects of this invention will be apparent from a reading of the specification and appended claims in conjunction with the attached drawings in which:

FIGURE 4 is a circuit and block diagram of an embodiment of the invention wherein a Peltier effect device is used; and FIGURE 5 is a circuit which may be inserted into FIGURE 4 for somewhat simplified operation of FIGURE 4.

While specific terminology will be resorted to after the first mention of a device or blackbox, these devices are not to be so limited and are to include all equivalents normally known in the art.

Figure 1:
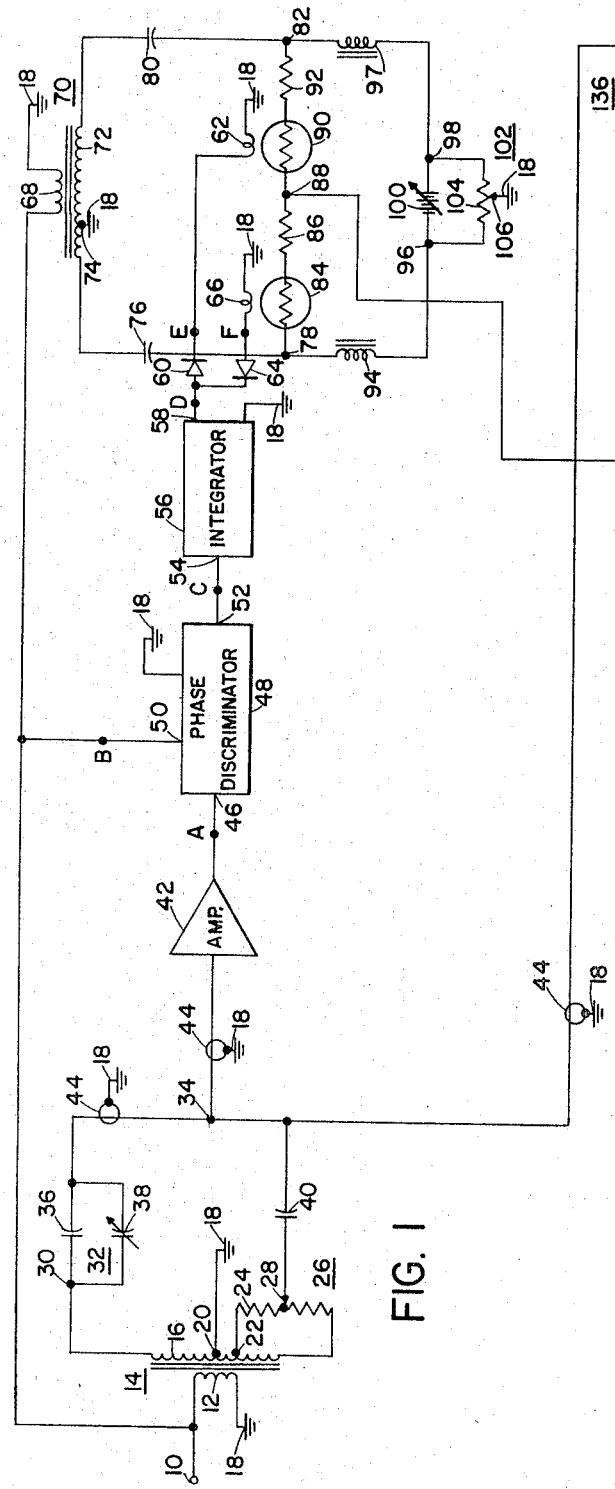
FIGURE 1 is a circuit diagram of one embodiment of the invention for use as a fuel level measuring unit.

In FIGURE 1 an input terminal 10 is connected to one end of a primary winding 12 on a transformer 14 having a secondary winding 16. The other end of the winding 12 is connected to ground or reference potential 18. The secondary winding 16 has a tap 20 connected to ground 18 and also has a tap 22 connected to one end of a resistance element 24 which is part of a variable resistance means 26. The variable resistance means 26 has a wiper 28. The other end of the resistance element 24 of variable resistance means 26 is connected to one end of secondary winding 16. The other end of secondary winding 16 is connected to a junction point 30. A tank unit generally designated as 32 is connected between the junction point 30 and a junction point 34. The tank unit 32 is depicted as two capacitors one of which is a constant value capacitor shown as 36 and the other is a variable capacitor shown as 38. The two capacitors 36 and 38 are connected in parallel to comprise the tank unit 32. A reference capacitor 40 is connected between the wiper 28 of variable resistance unit 26 and the junction point 34. The junction point 34 is connected to an input of an amplifier 42. Small circles 44 are shown around the wires leading to the input of amplifier 42 and these circles are connected to ground 18. These circles designate coaxial cable and illustrate that in some instances it may be desirable to shield the high impedance leads going directly to amplifier 42 for better operation of the circuit. The output of amplifier 42 is connected to a junction point designated as A and from there to an input 46 of a demodulator or phase discriminator 48. The phase discriminator 48 is also connected to ground potential 18. A reference input 50 of the phase discriminator 48 is connected to a junction point designated as B and from there to the input terminal 10. An output 52 of discriminator 48 is connected to a junction point C and from there to an input 54 of an integrating means, signal converting means, or logic means, 56. The integrator 56 is connected to ground 18 and also to a source of power which is not shown. An output 58 of integrator 56 is connected to a junction point D and from there to an anode of a diode means, or rectifying means, 60 which has a cathode connected to a junction point E. A heating element, or energy converting means, 62 is connected between junction point E and ground 18. A diode means, or rectifying means, 64 is connected between the junction point D and a junction point F. The cathode of diode 64 is connected to junction point D. The direction of easy current flow is away from junction point D through diode 60 and toward junction point D through diode 64 when junction D is at a positive potential. A heating element or energy converting means 66 is connected between the junction point F and ground 18. A primary winding 68 of a transformer 70, having a secondary winding 72, is connected between the input terminal 10 and ground 18. The transformer 70 supplies power to a bridge circuit or ratio circuit. The secondary winding 72 has a tap 74 connected to ground potential 18. As shown the tap 74 is not in the center of secondary winding 72 so as to conform with the circuit design of a fuel gauge unit. A capacitor, or isolating means, 76 is connected between one end of secondary winding 72 and a junction point 78. A capacitor or isolating means 80 is connected between the other end of secondary winding 72 and a junction point 82. A thermistor, temperature sensitive resistance means, variable resistive means, or transducer means, 84 is connected in series with a resistance element 86 between junction point 78 and a junction point 88. A transducer means, temperature sensitive resistance means, variable resistance means, or thermistor, 90 is connected in series with a resistance element 92 between the junction points 88 and 82. An inductance, isolating means, or filtering means, 94 is connected between the junction point 78 and a junction point 96. Another inductance means, isolating means, or filtering means, 97 is connected between the junction point 82 and a junction point 98. A variable potential means, variable battery means, or variable direct voltage supplying means, 100 is connected between the junction points 96 and 98. The positive terminal of battery 100 is connected to junction point 98. A potentiometer generally designated as 102 has a resistance element 104 connected between the junction points 96 and 98 and has a wiper 106 connected to ground 18. An inductive means, isolating means, or filter means 108 is connected between the junction point 88 and an output terminal 110. Another output terminal 112 is connected to ground 18. A capacitor or isolating means 114 is connected between the junction point 88 and a junction point 116. A transformer 118 has a primary winding 120 connected between junction point 116 and ground 18 and has a secondary winding 122 with one end connected to ground 18. A potentiometer 124 has a resistance element 126 connected between the other end of winding 122 and a tap 128 on winding 122. A wiper 130 of potentiometer 124 is connected to one end of a capacitor 132. The other end of capacitor 132 is connected to a junction point 134. The capacitor 132 is a reference capacitor for a compensating tank unit capacitor 136 which is connected between junction point 116 and the junction point 134. The compensating tank unit or capacitor 136 is shown as two separate capacitors 138 and 140. The capacitor 138 is shown as a fixed capacitive unit and the capacitor 140 is shown as a variable unit designating the variable dielectric qualities of the fuel which is being measured. The junction point 134 is connected to the input of amplifier 42 through junction point 34.

Figure 2:
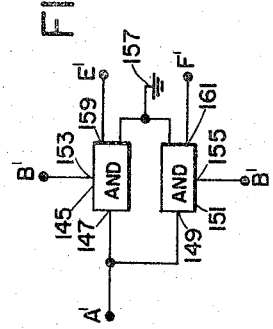
FIGURE 2 shows an insert which may be used in place of the phase discriminator and the integrator of FIGURE 1 in some applications.

In FIGURE 2 the terminals A', B', E' and F' are representative of the same terminals or junction points as in FIGURE 1 and the circuitry of FIGURE 2 may be inserted for the phase discriminator, integrator, and diode means of FIGURE 1 to directly replace the same. The circuitry of FIGURE 2 may be designated as logic means or trigger circuit means. An AND circuit 145 has one input 147 connected to terminal A'. Terminal A' is also connected to an input 149 of an AND circuit 151. Terminal B' is connected to inputs 153 and 155 of AND circuits 145 and 151 respectively. Both AND circuits are connected to ground 157 which may be the same as ground 18 in FIGURE 1. The AND circuit 145 is connected by an output 159 to junction point E'. An output 161 of AND circuit 155 is connected to junction point F'.

Figure 3:
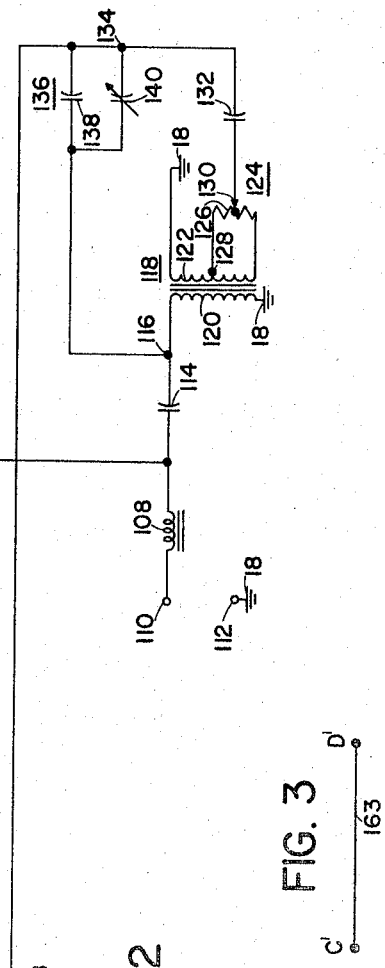
FIGURE 3 is another alteration of FIGURE 1 wherein the integrator is replaced by a wire.

FIGURE 3 shows a shorting wire or connecting means 163 which is connected between junction points C' and D' and may be used to directly replace the integrator 56 of FIGURE 1 in some instances.

In FIGURE 4 a transformer generally designated as 200 has a primary winding 202 connected between an input terminal 204 and ground 206. The transformer 200 also has a secondary winding 208 with a tap 210 connected to ground 206. A variable resistance means generally designated as 212 has a resistance element 214 connected between a tap 216 on winding 208 and one end of the secondary winding 208. A reference capacitor 218 is connected between a wiper 220 of variable resistance means 212 and a junction point 222. A tank unit generally designated as 224 is connected between the other end of secondary winding 208 and junction point 222. The tank unit 224 is shown as two parallel connected capacitors 226 and 228 with the capacitor 226 being a fixed capacitor and the capacitor 228 being a variable capacitor. The variable capacitor 228 is indicative of the changing capacitance resulting from fluid raising and lowering between the electrodes of tank unit 224. Circles 229 around the various leads again indicate coaxial cable, be used to obtain improved performance. An input 230 of an amplifier 232 is connected to the junction point 222. A lead 234 connects an output of amplifier 232 to an input 236 of a phase discriminator or demodulator 238. The phase discriminator 238 is also connected to ground 206. An input 240 of discriminator 238, which may be termed a reference input, is connected to the input terminal 204. An output 242 of phase discriminator 238 is connected to an input of an integrating means, or logic means, 244. The integrator 244 is connected to ground 206 and another output of integrator 244 is connected to a junction point K. A Peltier effect device, energy converting means, transducer means, or heat transferring means, 246 is connected between junction point K and ground 206. The device 246 may be an item having the commercial name "Frigistor" and sold by Frigistors, Limited, 5770 Andover Avenue, Montreal, 9, Quebec, Canada. Other devices which will perform the same function may also be used. The frigistor 246 is mechanically attached to a heat sink or other reference material 248. A thermistor, temperature sensitive element or variable resistance means, 250 is thermally attached to the frigistor 246. A transformer generally designated as 252 has a primary winding 254 connected between input 204 and ground 206 and also has a secondary winding 256. One end of the secondary winding 256 is connected to a junction point G while the other end is connected to a junction point H. A resistance means 258 is connected in series with the thermistor 250 between the junction points G and H. A junction point 260, between the thermistor 250 and the resistance means 258, is connected through a junction point J to one end of a capacitive means or isolating means 262 which has its other plate or electrode connected to the junction point 222. Dashed lines are shown enclosing both the thermistor 250 and a thermistor, temperature sensitive resistance means, variable resistance means, or energy converting means, 264. The dashed lines signify that thermistor 264 is in good thermal contact with the frigistor 246, and will vary in temperature in the same manner as thermistor 250. For the best results the two thermistors 250 and 264 will have identical characteristics or resistance changes with a given change in temperature. The thermistor 264 is connected between a junction point 266 and a junction point 268. A resistance element 270 is connected between the junction point 266 and a junction point 272. The junction point 266 is also connected to an output terminal 274. Another output terminal 276 is connected to ground 206. A variable potential means, variable battery means, or variable direct voltage means 278 is connected between the junction points 272 and 268 and in parallel with a resistance element 280 of a variable potentiometer generally designated as 282. A wiper 284 of the potentiometer 282 is connected to ground 206.

FIGURE 5 is a ratio circuit and is designed to replace the corresponding circuit of FIGURE 4 by inserting the circuit of FIGURE 5 at the terminals G, H, K and J of FIGURE 4 instead of the bridge circuit shown. The frigistor 300 is connected between a terminal K' and ground 302. The frigistor 300 can be the same as the frigistor 246 of FIGURE 4 and ground 302 can be the same as ground 206 of FIGURE 4. The frigistor 300 is mechanically and thermally attached to a heat sink 304. A capacitive means, or isolating means, 306 is connected between a terminal G' and a junction point 308. A capacitor means, or isolating means, 310 is connected between a terminal H' and a junction point 312. A resistive element 314 is connected between the junction point 308 and a junction point 316. A thermistor 318 is thermally and mechanically attached to the frigistor 300 and is electrically connected between the junction points 312 and 316. An inductance or filtering means 320 is connected between an output terminal 322 and the junction point 316. Junction point 316 is also connected to the terminal J. An inductance, or filtering means, 324 is connected between the junction point 312 and a junction point 326. An inductance, or filtering means, 328 is connected between the junction point 308 and a junction point 330. A variable voltage, adjustable battery, or direct voltage power supply means 332 is connected between the junction points 326 and 330 in parallel with a resistance element 334 of a variable resistance means generally designated as 336. The variable resistance element 336 has a wiper 338 connected to ground 302. Another output terminal 340 is connected to ground 302.

*Operation*

The operation of the circuit of FIGURE 1 is somewhat similar overall to the operation of the fuel measuring apparatus shown in a patent to Franzel et al. 3,037,385 issued June 5, 1962 and assigned to the same assignee as the present invention. However, the Franzel et al. invention uses a mechanical feedback and rebalance configuration whereas the present invention eliminates this possible source of unreliability. The bridge circuit of FIGURE 1 includes a tank unit 32 and a reference capacitor 40. The signal through reference capacitor 40 cancels out the empty tank capacitance of tank unit 32 so that a signal appearing at 34 is indicative of only the additional capacitance in tank unit 32 caused by the fluid rising between the electrodes of tank unit 32. This signal is applied to amplifier 42 and from there to the phase discriminator 48. The phase discriminator 48 may be any demodulator which is phase sensitive and provides an output which is either positive or negative depending upon the phase of the input signal with respect to the reference signal applied at input 50. Logic means such as shown in FIGURE 2 can also be utilized to perform the phase discrimination function wherein two AND circuits may be used and designed in such a manner that one AND circuit will provide an output only when both inputs are positive and the other AND circuit will provide an output only when one input is positive and the reference signal is negative. Such an AND may be constructed by incorporating an inverter in the reference input lead. This set of signals can then be applied to a double input integrator instead of a single input integrator such as shown in FIGURE 1.

The integrator 56 receives the signal from discriminator 48 and applies it to output terminal 58 and from there to the two diodes 60 and 64. If the output from integrator 56 is positive, a signal will flow through diode 60 and heating element 62 to heat thermistor 90. If the input to integrator 56 suddenly becomes negative, the output at 58 will start decreasing in amplitude as a function of time and eventually become negative and at the point it becomes negative, will allow current flow through diode 64 to start heating thermistor 84. At this time thermistor 90, no longer being heated, will dissipate heat to the environment. As may be determined, the thermistors 84 and 90 are a portion of a bridge circuit. The alternating current flow through these thermistors is supplied by the transformer 70. It may be assumed that at empty conditions, the resistances of the thermistors 84 and 90 in conjunction with the resistors 86 and 92 form a voltage dividing network such that the junction point 88 is at the same potential as tap 74 on secondary winding 72, which is connected to ground 18. If such is the case, there will be no alternating output from the thermistor bridge circuit. The potentiometer 102 can also be adjusted so that there is no direct voltage output under these conditions. It may be assumed that if a signal is now obtained from the bridge circuit having transformer 14, indicating that there is fluid between the capacitive plates of tank unit 32, thermistor 90 will be heated to lower its resistance and raise the voltage of junction point 88 with respect to ground 18. The junction point 88 will also be raised in potential with respect to the direct voltage flowing through the thermistors and provide an output through the filter or inductance 108 to the output terminal 110 to indicate that there is fluid between the electrodes of tank unit 32. The alternating component of the signal in the thermistor bridge circuit is applied to transformer 118. This transformer is also part of a bridge circuit having a compensator 136 and a reference capacitor 132. The reference capacitor 132 is of a value such that the current flow through it is equal to the current flow through tank unit 136 when there is no fluid between the plates of capacitor 136. The current flow from the combination of these two capacitors is then a function of the dielectric of the fluid and will vary in accordance with the dielectric of the fluid. A further explanation of this phenomenon can be obtained from the above-mentioned Franzel et al. patent. The alternating signal is applied to transformer 118 and through the capacitors 132 and 136 back to the junction point 34. This signal is out of phase with the signal obtained from tank unit 32 and will act to reduce the magnitude of the effective signal applied to amplifier 42. When thermistor 90 is heated to a low enough resistance value, the signal obtained from compensator 140 will almost exactly counteract the signal obtained from tank unit 38 and as a result there will be a minimum of output from the integrator 56 to heat thermistor 90. The output from integrator 56 will always be some finite value in order to compensate for heat losses in the thermistor due to the temperature differential between the thermistor and the environment. However, if the amplifier 42 is of a very high gain type, the error between the signals from the two portions of the capacitive bridge circuit will be negligibly small.

It may not always be necessary to use the integrator 56 and the circuit of FIGURE 2 can be used as a phase discriminator without the use of integrator 56. When the circuit of FIGURE 2 is used to replace the appropriate portions of FIGURE 1, the amplifier output will be applied to either heater 62 or 66 depending upon the phase of the input signal with respect to the reference signal applied at terminal B. If the input is positive at the same time that the signal at terminal B is positive, an output will be obtained at terminal E and will heat element 62. If the input at A is positive at the same time as the input at B is negative, the AND circuit 151 will supply an output at F and accordingly heat the heating element 66. Logic circuits to perform the functions just described are very common and accordingly a further description will not be given. The main difference in operation between that previously described and the use of FIGURE 2 is that upon change of the phase of the input signal, the output will be immediately changed to the other heating element instead of waiting a time period dependent upon the amplitude of the previous signal before heating the other element. This provides a much quicker time response and in some applications may introduce oscillations or runaway conditions of the thermistors. However, in most instances especially where the heat loss from the thermistors is quite high, this is not likely to be a problem.

FIGURE 3 shows a shorting wire which may be placed between points C and D of FIGURE 1 and again eliminate the integrator 56 as was mentioned previously in using FIGURE 2 to replace certain portions of FIGURE 1. Again, the circuit will perform substantially the same as when FIGURE 2 is used to replace a portion of FIGURE 1. The main difference will be that there will be an immediate change of signals supplied to the heating elements upon a change in phase of the input signal to amplifier 42.

The operation of FIGURE 4 is very similar to that of FIGURE 1 in that the output signal is obtained from a bridge circuit using transformer 200, which is indicative of the amount of fluid between the electrodes of tank unit 224. This signal is supplied to amplifier 232, from there to phase discriminator 238 and finally to integrator 244. The output from integrator 244 is applied to a Peltier effect transducer rather than to heating elements. The Peltier effect transducer as previously mentioned has a trade name of "frigistor" and will heat upon one direction of current flow therethrough and will cool when the current flow is in the opposite direction through the frigistor. This action is accomplished by the means of heat transfer from one junction to the other and the cooling is accomplished by transferring heat from one junction to the junction which is attached to the heat sink 248. It can thus be seen that the thermistor 250 is either cooled or heated to keep the junction point 260 at a desired potential. The output from junction point 260 is applied through capacitor 262 to counteract the effect of the signal from tank unit 224 and reduce the output from integrator 244 to a minimum amount which indicates that balance conditions are reached. If the fuel level is now lowered, there will be less current flow through the tank unit 224 and a signal of the opposite polarity will be applied to integrator 244 to reduce the output level below what it had previously been. If the time necessary to cool the thermistor 250 is quite long, the output of the integrator may even go negative to cool the thermistor 250 through the cooling action of the frigistor 246. The output from junction point 260 will oscillate with ever decreasing changes in amplitude until the circuit is again in balanced condition. If a thermistor such as 264 is placed in good thermal contact with thermistor 250 or the frigistor 246, a completely separate circuit can be used to provide a direct voltage output indicative of the quantity or level of fluid. This will be true since both thermistors will change the same amount and identical bridge circuits may be utilized so that proportionally the same outputs are obtained. To adjust the bridge circuit, an empty condition is obtained and the circuit is allowed to settle down to a stable output and then the wiper 284 is adjusted to provide zero voltage output between terminals 274 and 276. The tank unit is then filled with fluid and the alternating voltage circuit again allowed to stabilize. At this time the voltage of battery 278 is adjusted to provide a full output signal indication between junction points 274 and 276. The circuit is then calibrated for use in a fuel measurement system. A similar adjustment may be used to calibrate the circuitry of FIGURE 1.

In the event that it is uneconomical or impractical to match thermistors, the circuit of FIGURE 5 may be inserted into the circuit of FIGURE 4 at the appropriately marked points. This new configuration will be somewhat similar to that of FIGURE 1 since both the alternating and direct voltage portions are combined. The inductances 328 and 324 will prevent the alternating signal from affecting the battery 332 and the capacitors 306 and 310 will prevent direct current from flowing through the transformer 252. The inductance 320 will prevent the alternating component of the output signal from being applied to output terminals 322 and 340. The capacitor 262 will of course eliminate the possibility of direct current flow to the amplifier 232. Otherwise, the operation of FIGURE 5 in FIGURE 4 is the same as previously described for the operation of FIGURE 4.

Although it has not been described, it is to be realized that the circuit of FIGURE 1 will work with only one thermistor and one heating element wherein the thermistor is either heated or not heated to change the resistance of the legs of the bridge circuit. As will be realized the time constant of this circuit may be quite long and will be dependent upon the temperature differential between the thermistor 90 and the environment.

For high frequency applications, any of the circuits will work satisfactorily. However, for low frequency circuits, the weight of the inductances in FIGURES 1 and 5 may be objectionable in attempting to obtain a low enough direct current resistance in the windings of the choke. This low resistance is necessary to prevent interaction with the output due to presentation by the choke of a resistance comparable to that provided in the legs of the bridge circuit.

While an amplifier has been described in each instance, it will be realized that the amplifier may be eliminated in some systems and may be combined with the phase discriminator or other units in other systems. Further, although FIGURE 4 does not show the full bridge circuit of FIGURE 1, FIGURE 4 can be designed to utilize the FIGURE 1 bridge circuit.

Although the systems described have been described as being used in conjunction with fuel gauge units, it is to be realized that the basic idea is the use of temperature sensitive units in a resistive bridge network for providing a feedback signal which will close an electronic loop.

I therefore wish to be limited not by the description but only by the appended claims.

I claim:

1. Electronic fuel gaging apparatus comprising, in combination:

first bridge circuit means including output means, tank unit capacitive sensor means, and empty tank reference capacitive means, a signal from said empty tank capacitive means being substantially equal in amplitude to a signal from said sensor means indicating an empty condition;

phase detector means including input, reference and output means, said phase detector means providing an output signal of one polarity when an input signal supplied to said input means of said phase detector means is of a given phase relationship with respect to a reference signal supplied to said reference means and providing an output signal of the opposite polarity when the input and the reference signals are in the opposite phase relationship;

summing means connecting said output means of said first bridge circuit to said input means of said phase detector means;

integrating means including input means and first and second output means, an output signal at said first output means of said integrating means increasing with respect to an output signal at said second output means of said integrating means when a first polarity input signal is supplied to said input means of said integrating means and the output signal at said first output means of said integrating means decreasing with respect to the output signal at said second output means of said integrating means when a second polarity input signal is supplied to said input means of said integrating means;

first and second heating element means connected to said first and second output means respectively of said integrating means;

first and second temperature sensitive resistive element means operatively positioned contiguous said first and second heating element means;

first means for supplying an alternating reference signal, said first means being connected to said reference means of said phase detector means and also connected to said first and second temperature sensitive resistive element means to form a second bridge circuit;

second means for supplying a direct voltage, said second means being operatively connected across said first and second temperature sensitive resistive element means;

output means connected to said first and second temperature sensitive means for providing a unidirectional output voltage indicative of fuel level; and feedback means including input means connected to said first and second temperature sensitive resistive element for receiving an alternating signal therefrom, output means connected to said output means of said first bridge circuit means, compensating capacitive means, and reference compensating capacitive means, said feedback means supplying a signal of a phase opposite that supplied by said first bridge circuit means for minimizing the amplitude of the input signal supplied to said phase detector means.

2. Electronic fuel gaging apparatus comprising, in combination:

first bridge circuit means including output means, tank unit capacitive sensor means, and empty tank reference capacitive means, a signal from said empty tank capacitive means being substantially equal in amplitude to a signal from said sensor means indicating an empty condition;

phase detector means including input, reference and output means, said phase detector means providing an output signal of one polarity when an input signal supplied to said input means of said phase detector means is a given phase relationship with respect to a reference signal supplied to said reference means and providing an output signal of the opposite polarity when the input and the reference signals are in a different phase relationship;

summing means connecting said output means of said first bridge circuit to said input means of said phase detector means;

integrating means including input means and first and second output means, an output signal at said first output means of said integrating means increasing with respect to an output signal at said second output means of said integrating means when a first polarity input signal is supplied to said input means of said integrating means and the output signal at said first output means of said integrating means decreasing with respect to the output signal at said second output means of said integrating means when a second polarity input signal is supplied to said input means of said integrating means;

first and second heating element means connected to said output means of said phase detector means;

first and second temperature sensitive resistive element means operatively positioned contiguous said first and second heating element means;

first means for supplying an alternating reference signal connected to said reference means of said phase detector means and also connected to said first and second temperature sensitive resistive element means to form a second bridge circuit;

second means for supplying a direct voltage, said second means being operatively connected across said first and second temperature sensitive resistive element means;

output means connected to said first and second temperature sensitive means for providing a unidirectional output voltage indicative of fuel level; and feedback means including input means connected to said first and second temperature sensitive resistive element for receiving an alternating signal therefrom, and output means connected to said output means of said first bridge circuit means, said feedback means supplying a signal of a phase opposite that supplied by said first bridge circuit means for minimizing the amplitude of the input signal supplied to said phase detector means.

3. Electronic fuel gaging apparatus comprising, in combination:

first bridge circuit means including output means, tank unit capacitive sensor means, and empty tank reference capacitive means;

phase detector means including input, reference and output means, said phase detector means providing an output signal of one polarity when an input signal supplied to said input means of said phase detector means is a given phase relationship with respect to a reference signal supplied to said reference means and providing an output signal of the opposite polarity when the input and the reference signals are in the opposite phase relationship;

summing means connecting said output means of said first bridge circuit to said input means of said phase detector means;

integrating means including input means and first and second output means, an output signal at said first output means of said integrating means increasing with respect to an output signal at said second output means of said integrating means when a first polarity input signal is supplied to said input means of said integrating means and the output signal at said first output means of said integrating means decreasing with respect to the output signal at said second output means of said integrating means when a second polarity input signal is supplied to said input means of said integrating means;

heating element means connected to said output means of said integrating means;

temperature sensitive resistive element means operatively positioned contiguous said heating element means;

first means for supplying an alternating reference signal connected to said reference means of said phase detector means and also connected to said temperature sensitive resistive element means to form a second bridge circuit;

second means for supplying a direct voltage, said second means being operatively connected to said temperature sensitive resistive element means;

output means connected to said temperature sensitive means for providing a unidirectional output voltage indicative of fuel level; and feedback means including input means connected to said temperature sensitive resistive element for receiving an alternating signal therefrom, and output means connected to said output means of said first bridge circuit means, said feedback means supplying a signal of a phase opposite that supplied by said first bridge circuit means for minimizing the amplitude of the input signal supplied to said phase detector means.

4. Apparatus for converting an alternating signal to a direct signal comprising, in combination:

first means for supplying an input first signal to be converted;

trigger circuit means including input means and first and second output means, said trigger circuit providing mutually exclusive output second and third signals at said first and second output means respectively, the phase of a signal being supplied to said input means of said trigger circuit means determining whether said second or said third signal is supplied;

first and second heater element means connected to said first and second output means respectively of said trigger circuit means;

ratio circuit means including output means and first and second temperature sensitive resistance means operatively positioned adjacent said first and second heater element means respectively, said ratio circuit means supplying both alternating and direct currents to said first and second temperature sensitive resistive means, and said ratio circuit supplying direct and alternating outputs indicative of the relative resistances of said first and second temperature sensitive resistance means;

indicator means connected to said output means of said ratio circuit means for receiving the direct output therefrom; and feedback means including isolating means, connected between said output means of said ratio circuit means and said input means of said trigger circuit means for supplying the alternating signal thereto, the alternating signal normally being substantially equal in amplitude to said first signal but of a phase opposite the phase of said first signal.

5. Condition responsive apparatus comprising, in combination:
bridge circuit means for providing a first output signal at an output means indicative of a condition;
logic means including input means and first and second output means, said first and second output means comprising first and second heating elements, said logic means supplying an output at said first output means of said logic means when an input signal of a given phase is supplied to said input means of said logic means and supplying an output at said second output means of said logic means when an input signal of a phase opposite said given phase is supplied to said input means of said logic means;
ratio circuit means including first and second temperature sensitive resistance element means operatively positioned contiguous the heating element means in said output means of said logic means and including output means, said ratio circuit means providing second output unidirectional and third output alternating signals at said output means of said ratio circuit means, said second and third output signals being indicative of the relative resistances of said first and second temperature sensitive resistance element means;
means connecting said output means of said bridge circuit means and said output means of said ratio circuit means to said input means of said logic means in a feedback arrangement; and
indicating means connected to said output means of said logic means for providing an indication responsive to said second output signal.

6. Rebalanceable condition sensing apparatus comprising, in combination:
bridge circuit means including output means for supplying a first signal indicative of a condition;
logic means connected to said output means of said bridge circuit means, said logic means including output means, and said logic means providing an output second signal which has a polarity dependent upon whether an input signal supplied to said logic means is of a first phase or of a phase opposite said first phase;
integrating means connected to said output means of said logic means, said integrating means including output means, and said integrating means providing an output third signal indicative of said second signal as integrated over a period of time;
temperature sensitive resistive means operatively connected to said output means of said integrating means, said temperature sensitive resistive means changing temperature and resistance as functions of said third output signal;
ratio circuit means including output means and said temperature sensitive resistive means, said ratio circuit means providing direct and alternating output signals indicative of the resistance of said temperature sensitive resistive means as compared with the resistance of said resistive means at a given temperature;
means connected to said output means of said ratio circuit means, said means providing an output representative of said direct signal; and
feedback means connected between said output means of said ratio circuit means and said input means of said logic means for supplying said alternating signal thereto, said alternating signal opposing said first signal to minimize any resultant input signal to said logic means.

7. Apparatus for converting an alternating signal to a direct signal comprising, in combination:
first means for supplying an input first signal to be converted;
trigger circuit means including input means and first and second output means, said trigger circuit providing an output signal of variable polarity between said first and second output means, the phase of a signal being supplied to said input means determining the polarity of the output signal;
heater element means connected between said first and second output means respectively of said trigger circuit means;
ratio circuit means including output means and temperature sensitive resistance means operatively positioned adjacent said heater element means, said ratio circuit means supplying both alternating and direct currents to said temperature sensitive resistive means, said ratio circuit supplying direct and alternating outputs indicative of the resistance of said temperature sensitive resistance means;
indicator means connected to said output means of said ratio circuit means for receiving the direct output therefrom; and
feedback means including isolating means, connected between said output means of said ratio circuit means and said input means of said trigger circuit means for supplying the alternating signal thereto.

8. Condition responsive apparatus comprising, in combination:
bridge circuit means for providing a first output signal at an output means indicative of a condition;
logic means including input means and output means, said output means comprising energy transferring means, said logic means supplying a first output at said output means of said logic means when an input signal of a given phase is supplied to said input means of said logic means and supplying a second output at said output means of said logic means when an input signal of a phase opposite said given phase is supplied to said input means of said logic means;
ratio circuit means including said energy transferring means, said ratio circuit means providing second and third output unidirectional and alternating signals at said output means of said ratio circuit means, said second and third output signals being indicative of the resistance of said energy transferring means;
means connecting said output means of said bridge circuit means and said output means of said ratio circuit means to said input means of said logic means in a feedback arrangement; and
indicating means connected to said output means of said logic means for providing an indication responsive to said second output signal.

9. Rebalanceable condition sensing apparatus comprising, in combination:
bridge circuit means including output means for supplying a first signal indicative of a condition;
logic means connected to said output means of said bridge circuit means, said logic means including output means, and said logic means providing an output second signal which has a polarity dependent upon whether an input signal supplied to said logic means is of a first phase or of a phase opposite said first phase;
integrating means connected to said output means of said logic means, said integrating means including output means, and said integrating means providing an output third signal indicative of said second signal as integrated over a period of time;
transducer means operatively connected to said output means of said integrating means, said transducer means changing resistance as a function of said third output signal;
ratio circuit means including output means and said transducer means, said ratio circuit means providing direct and alternating output signals indicative of the resistance of said transducer means;

indicating means connected to said output means of said ratio circuit means, said indicating means providing an output representative of said direct signal; and feedback means connected between said output means of said ratio circuit means and said input means of said logic means for supplying said alternating signal thereto, said alternating signal opposing said first signal to minimize any resultant input signal to said logic means.

References Cited by the Examiner

UNITED STATES PATENTS

| | | | |
|---|---|---|---|
| 2,463,805 | 3/1949 | Polye et al. | 323—69 |
| 2,745,283 | 5/1956 | Hastings | 73—204 |
| 2,769,071 | 10/1956 | Ward | 323—75 |
| 3,208,280 | 9/1965 | Exon | 73—304 |

LOUIS R. PRINCE, *Primary Examiner.*

S. C. SWISHER, *Assistant Examiner.*